Aug. 12, 1941.  W. PAULUS  2,252,350
WINDSHIELD CLEANER CONSTRUCTION
Filed June 3, 1937  2 Sheets-Sheet 2
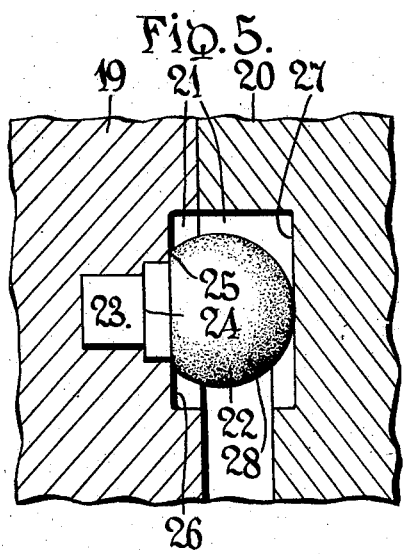
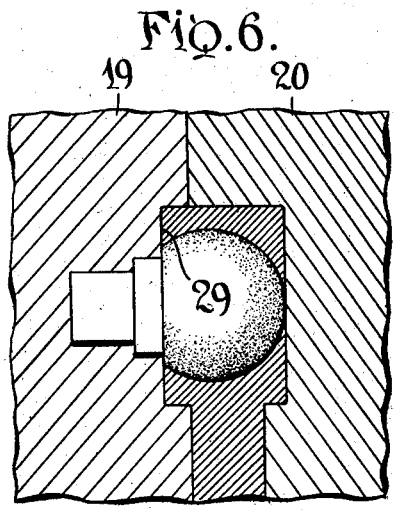
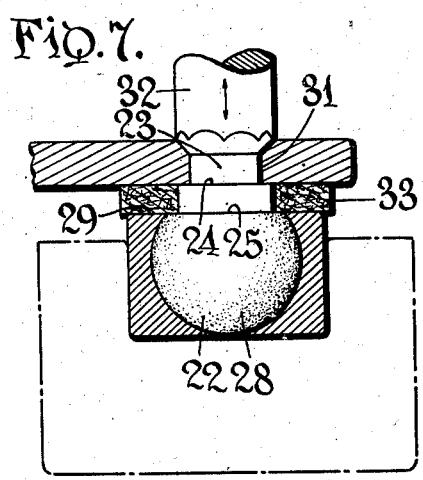
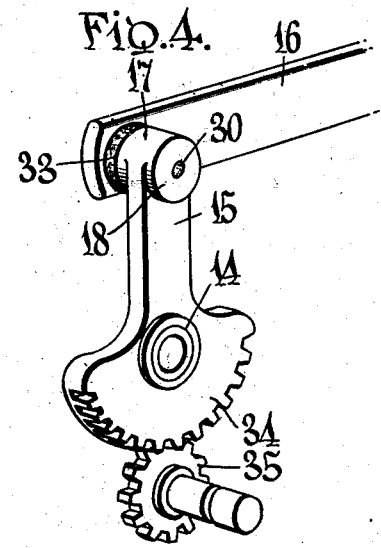
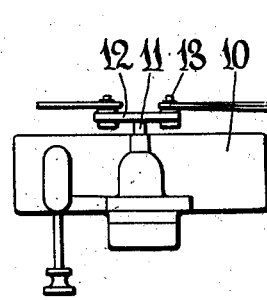
INVENTOR
William Paulus,
BY
Beau, Brooks, Buckley & Beau
ATTORNEYS Patented Aug. 12, 1941

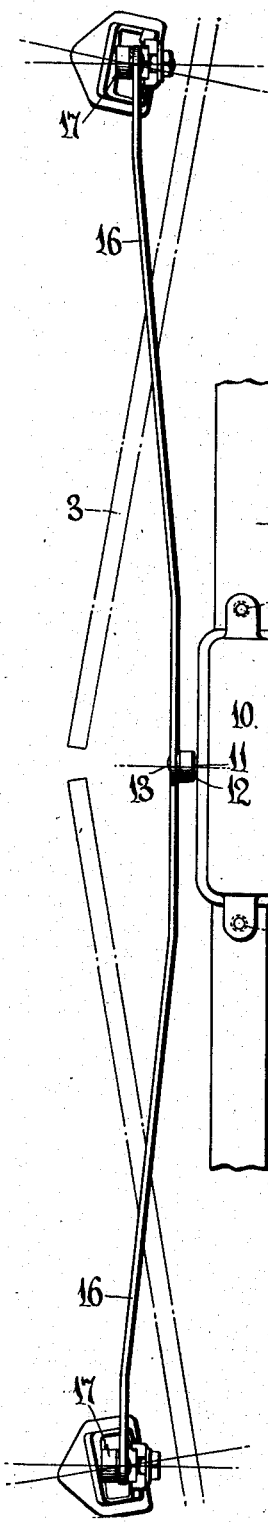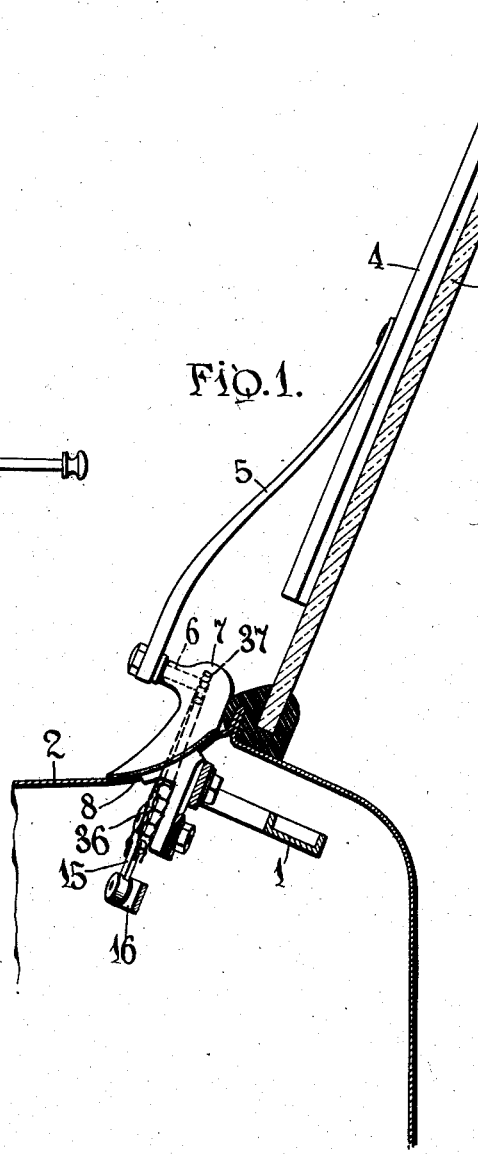

2,252,350

UNITED STATES PATENT OFFICE 2,252,350

WINDSHIELD CLEANER CONSTRUCTION

William Paulus, Buffalo, N. Y., assignor to Trico Products Corporation, Buffalo, N. Y.

Application June 3, 1937, Serial No. 146,215

2 Claims. (Cl. 15—255)

This invention relates to a motor vehicle construction and primarily to the installation and embodiment of the windshield operating mechanism therein.

In the mass production of motor vehicles as now practiced, the frame pieces and body members are assembled and spot welded together. Certain of these body parts are provided with openings for the mounting of windshield cleaner mechanism, as the body assumes a definite shape. While every precaution is taken to properly set and weld the components of the body in an accurate manner, at times slight misalignment in the members occurs which works a hardship when it comes to the installation of the windshield cleaner mechanism where, for instance, one part is mounted on the body, such as the cowl, and another part on the frame. It has heretofore been necessary to provide oversize holes in the body parts to facilitate the mounting of the cleaner mechanism under all conditions but this method has necessitated considerable labor and sometimes a relocation of the parts of the cleaner mechanism.

The object of the present invention is to provide a windshield cleaner mechanism which has a certain amount of flexibility in its make-up for more readily adapting the same to various conditions of mounting in the motor vehicle.

It further has for its object to provide a windshield cleaner mechanism with a self-aligning transmission by which the efficiency of the windshield cleaner is improved and its firm and secure mounting facilitated.

In the accompanying drawings:

Fig. 1 is a vertical sectional view through a motor vehicle having incorporated therein the improved windshield cleaner construction;

Fig. 2 is a horizontal sectional view through the motor vehicle, better illustrating the arrangement of parts;

Fig. 3 is a fragmentary plan view of a modified windshield cleaner mechanism removed from the vehicle.

Fig. 4 is a detailed perspective view thereof; and

Figs. 5, 6 and 7 are detailed views illustrating the mode of manufacturing a part of the cleaner mechanism.

Referring more particularly to the drawings, the numeral 1 designates one of the frame members of a motor vehicle construction and 2 the cowl sheathing or body member which extends forwardly from the windshield 3 on which the wiper 4 is operable by the actuating arm 5. The windshield illustrated is of the divided type with each section thereof sloping rearwardly in an upward direction, and the wiper actuating shaft 6, which carries the arm 5, is disposed substantially at a normal to the plane of the respective section. This shaft is journaled in a supporting standard 7 that is removably mounted in an opening 8 formed in the cowl at the time of shaping the same.

The framing member 1 is likewise provided with openings 9 mounting the windshield cleaner motor or drive 10. When the body members, such as parts 1 and 2, are assembled and spot welded together by the usual jigs, any slight misalignment of such assembled parts throws the provided openings out of dimensional relation. It is to facilitate the installation of the cleaner mechanism under such conditions or regardless of misalignment that the present invention is primarily designed. The windshield cleaner motor or drive 10 is provided with a drive shaft 11 having a crank member 12 equipped with one or more crank pins 13 depending upon the number of wipers to be operated. Each crank pin is connected by a compensating transmission to a wiper mounting unit of which the wiper shaft 6 forms a part.

Each wiper mounting unit comprises, in addition to the wiper shaft 6 and its support 7, an intermediate shaft or member 14 which has an integral crank part 15 and is designed to operate on an axis on the support 7 that is substantially parallel to the axis of the drive shaft 11.

In accordance with the present invention means are provided to compensate for any angular displacement between the axes of the shafts 11 and 14 which may be found when the shafts have been installed. To this end a flexible transmission is provided to connect the cranks 12 and 15 so that while these two cranks might oscillate on axes that have become relatively displaced, the power is transmitted from one to the other without binding or other unmechanical action. The crank arms 12 and 15 may be disposed to operate in the same plane, but where they are disposed in separate planes, as shown in Fig. 2, the ends of the connecting link 16 may be offset in parallel planes to accommodate any end thrust to better advantage.

Where the shafts 11 and 14 are angularly displaced with respect to each other then it is desired to connect the outer end of the link 16 to one or both of the crank arms by a universal connection, such as the ball and socket joint generally indicated at 17 and which may be formed by die casting one of the joint parts, such as the socket part, on the companion part, the ball. In fact, the crank arm 15, being integrally formed with the socket 18, is also cast simultaneously therewith. The intermediate shaft 14 may be dispensed with in certain constructions in which event the crank arm may be formed on the wiper shaft.

The method of forming this joint constitutes the subject matter of my application Serial No. 239,643 and may be briefly described as follows with reference to Figs. 5, 6 and 7. The mold has two sections 19 and 20 formed with complemental recesses 21, shaped to give the final design to the formed crank arm. The ball 22 is initially provided with a stem 23 which is received in a corresponding recess formed in the mold section 19. A spacing shoulder 24 joins the stem 23 to the ball, which latter has an outwardly extending shoulder 25 for seating on the inner face 26 of the mold cavity formed in the section 19. The mold cavity in section 20 is of a sufficient depth to receive the ball and, in order to properly position the ball, the opposing bottom wall 27 of the cavity engages the outer arc of the ball to hold the same firmly while the molten metal is being poured thereabout. Preliminary to the pouring step the ball is given a graphite coating 28.

After the molding process, the united ball and crank arm unit is removed from the mold as a rigid structure with the face 29 of the socket forming a continuation of the shoulder 25. The opposite face of the socket may expose a portion of the ball, as indicated at 30, by reason of its contact with the bottom wall 27 of the mold cavity. The graphite serves to prevent too great adhesion between the ball and its socket so that when the stem 23 of the ball is secured to the link 16, as by a swaging or riveting step, the ball will be jarred loose from the walls of the socket to freely pivot and roll therein. In connecting the ball to the link 16 the latter is formed with an opening 31 through which the stem 23 is extended with the spacing shoulders 24 abutting one side face of the link. From the opposite side face of the link the end of the stem is swaged over as by the swaging tool 32 (Fig. 7). Preliminary to this swaging action a lubricant holding felt collar or disc 33 is positioned about the spacing shoulder 24 for lubricating the socket after the loosening action and during windshield cleaner operation.

As shown in Fig. 4, the shaft or hub 14 may have formed integrally therewith a gear sector 34 for meshing with a pinion 35 mounted on the wiper shaft 6, in the case of the header installation of the windshield cleaner, or the gear sector may be so shaped to receive a power transmitting chain 36, Fig. 1, to engage over a sprocket gear 37 disposed within the supporting housing 7, in the case of a cowl mounted windshield cleaner. The gears 34 and 35 are mounted in their unit to oscillate on parallel axes, while the shafts 14 and 11 operate on angularly displaced axes. This will cause the outer end of the link 16 to oscillate laterally as depicted in Fig. 3.

By reason of the permanent securement of each link 16 with its corresponding crank arm and gear sector entirety, a power transmitting unit is provided which is readily installed in the motor vehicle without regard to ultimate precision requirements in the fabrication of the vehicle body. While the description has been given in detail, it is not intended to limit the invention thereby, since the same is obviously capable of other physical embodiments without departing from the spirit or scope claimed.

What is claimed is:

1. In a motor vehicle having rearwardly extending and angularly related windshield sections, an underlying body frame member, and a forwardly extending cowl; a wiper shaft journaled on the cowl at a normal to each section, a windshield cleaner drive disposed on said frame member between the windshield sections and having a driving crank member, the axes of the wiper shafts being angularly related to each other and to that of the driving crank member, and a removable transmission unit interposed between the crank member and each wiper shaft, each unit comprising a reciprocatory link connected at one end to the crank member, a gear member connected to the opposite end of the link by a ball and socket joint, and means connecting the gear member to the adjacent wiper shaft.

2. A transmission unit for connecting the wiper shaft of a windshield cleaner to a drive shaft wherein a link is connected at one end to a crank part on the drive shaft and at its opposite end to the crank arm of a member in turn connected to the wiper shaft for oscillating the same, said unit comprising a ball and socket joint between the link and crank arm so arranged that the socket part is carried by one element and opens toward the companion element, and a compressible lubricant holding member interposed between the socket and said companion element, the axis of the crank arm being angularly displaced relative to that of the drive shaft so that during the reciprocation of the link the lubricant holding member will be compressed intermittently by reason of the angular displacement.

WILLIAM PAULUS.